June 11, 1935.  C. A. OLSON ET AL  2,004,536
MOTOR MOUNTING
Filed Dec. 23, 1933
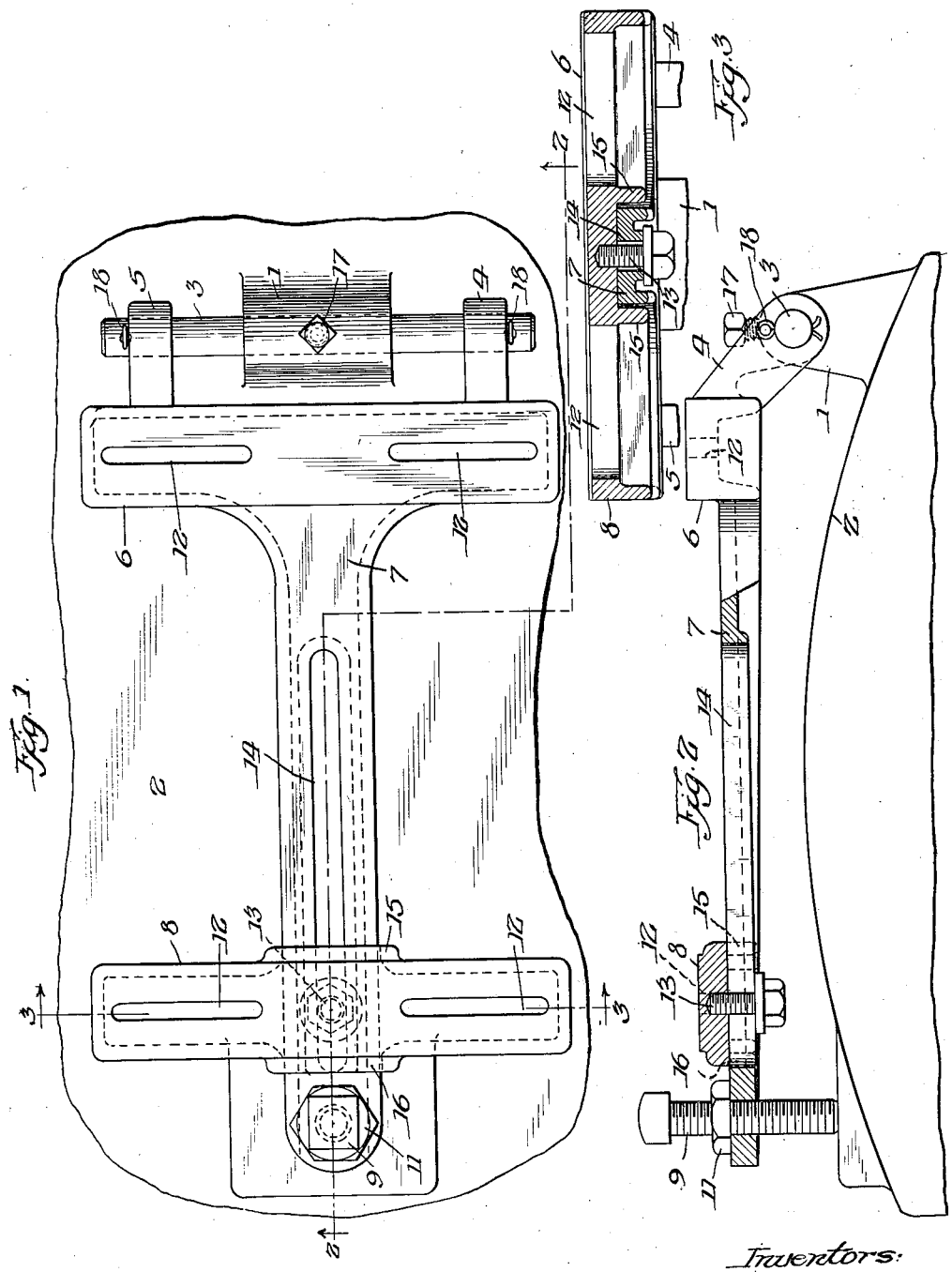
Witness:
R. B. Davison.
Inventors:
Charles A. Olson &
Glenn A. Patterson
By Ira J. Wilson Atty Patented June 11, 1935

2,004,536

UNITED STATES PATENT OFFICE 2,004,536

MOTOR MOUNTING

Charles A. Olson, Geneva, and Glenn A. Patterson, Chicago, Ill., assignors to Crane Co., Chicago, Ill., a corporation of Illinois Application December 23, 1933, Serial No. 703,750

6 Claims. (Cl. 74—242.13)

This invention pertains to mountings constructed to accommodate electric motor bases of various widths and lengths.

The adjustable motor mounting which is provided in accordance with this invention finds advantageous use in connection with deep well pumps, in which event the mounting is secured on or adjoining the pump casing. Of course, this motor mounting also is suitable for use with driven units other than pumps. Most machines are intended to be driven by one predetermined size of motor but deep well pumps are an exception for the reason that the amount of power required to operate a deep well pump varies with the depth of the well.

The primary object of the invention is to provide a mounting for motors having such adjustable connection with the bases of motors that many different widths and lengths of motor bases may be accommodated thereupon.

Various particular objects and advantages of the invention will be set forth hereinafter.

In the drawing:

Fig. 1 is a top plan view showing an embodiment of the invention,

Fig. 2 is a view partly in section and partly in elevation taken along the line 2—2 of Fig. 1, and Fig. 3 is a vertical section on the line 3—3 of Fig. 1.

Referring now to the drawing, the embodiment as shown includes a bracket 1 which is fixed upon any suitable base 2, such as the casing of a pump if the motor is to be used with a pump, or on some other base. The upstanding bracket 1 carries a pintle 3 which is embraced by two ears 4 and 5 secured to a cross member 6. The cross member 6 is integrally connected with a longitudinal member 7 on which is slidably mounted a second cross member 8. A set screw 9, threaded through the outer end of the longitudinal member or tongue 7 and provided with the customary lock nut 11, is employed to vary the height of the motor mounting above the base or casing 2, whenever the motor pulley is connected with a belt extending downwardly to a pulley below the mounting. Thus this set screw can be employed to vary the tension on the belt.

Each of the cross members is pierced by elongated slots 12 through which bolts extending through the base of a motor may be passed in the usual manner, the elongation of the slots making it possible to mount thereon various sizes of motors whose bolt holes may be spaced apart at various distances.

The cross member 8 is provided with a set screw 13 extending upwardly through the elongated slot 14 and serving to lock the cross member in any desired position along the length of the tongue 7. The member 8 is enlarged at its central portion by the bosses 15 and 16 which are shaped to fit snugly about the top and sides of the tongue 7 so that the fit of the member 8 about the tongue will readily prevent the member from being twisted out of its proper transverse position.

A set screw 17 holds the pintle 3 against shifting, after it has once been fixed at a desired location relatively to the bracket 1. The cotter pins 18 will prevent the entire mounting from shifting laterally after the screw 17 has been set.

It is apparent that the motor mounting herein shown and described is well adapted to receive the bases of motors as the latter are now generally manufactured. The flat topped cross members with their slots will cooperate readily with the motor bases of current designs, but should there be in the future any differently designed motor bases, it is contemplated that this invention may be modified within the appropriate scope of the invention to meet the requirements of such different motor bases.

Having shown and described our invention, we claim:

1. A mounting for electric motors comprising a base and pedestal upstanding therefrom, a motor support cross member pivotally connected with said pedestal about an axis parallel to its own length, a single tongue rigidly supported on said member extending from the middle portion thereof at right angles thereto, adjustable means connected with the end of said tongue remote from said cross member for resting on said base for adjustably regulating and determining the angular position of said cross member and tongue about said pivotal connection, a second motor support cross member solely supported on and slidably mounted transversely on said tongue, and means for clamping the second member to said tongue in a plurality of adjusted positions, said second member fitting snugly over the top and sides of said tongue for maintaining the transverse positioning of the last said member.

2. A mounting for electric motors comprising a base and pedestal upstanding therefrom, a motor support cross member pivotally connected with said pedestal about an axis parallel to its own length, a single tongue rigidly supported on said member extending from the middle portion thereof at right angles thereto, adjustable means connected with the end of said tongue remote from said cross member for resting on said base for adjustably regulating and determining the angular position of said cross member and tongue about said pivotal connection, a second motor support cross member solely supported on and slidably mounted transversely on said tongue, and means for clamping the second member to said tongue in a plurality of adjusted positions.

3. A mounting for electric motors comprising a base and pedestal upstanding therefrom, a motor support cross member pivotally connected with said pedestal about an axis parallel to its own length, a single tongue rigidly supported on said member extending from the middle portion thereof at right angles thereto, adjustable means connected with the end of said tongue remote from said cross member for resting on said base for adjustably regulating and determining the angular position of said cross member and tongue about said pivotal connection, a second motor support cross member solely supported on and slidably mounted transversely on said tongue between said adjustable means and the first cross member, and means for clamping the second member to said tongue in a plurality of adjusted positions.

4. A mounting for electric motors comprising a base and pedestal upstanding therefrom, a motor support cross member pivotally connected with said pedestal about an axis parallel to its own length, a single tongue rigidly supported on said member extending from the middle portion thereof at right angles thereto, said tongue having a central longitudinal slot, adjustable means connected with the end of said tongue remote from said cross member for resting on said base for adjustably regulating and determining the angular position of said cross member and tongue about said pivotal connection, a second motor support cross member solely supported on and slidably mounted transversely on said tongue, and means extending through the tongue slot for rigidly clamping the second member in any of a plurality of positions along said tongue.

5. A mounting for electric motors comprising a base and pedestal upstanding therefrom, a motor support cross member pivotally connected with said pedestal about an axis parallel to its own length, a single tongue rigidly supported on said member extending from the middle portion thereof at right angles thereto, adjustable means connected with the end of said tongue remote from said cross member for resting on said base for adjustably regulating and determining the angular position of said cross member and tongue about said pivotal connection, a second motor support cross member solely supported on and slidably mounted transversely on said tongue, and means for clamping the second member to said tongue in a plurality of adjusted positions, both cross members having longitudinal slots for receiving bolts for securing a motor thereto.

6. A mounting for electric motors comprising a base and pedestal upstanding therefrom, a motor support cross member pivotally connected with said pedestal about an axis parallel to its own length, a single tongue rigidly supported on said member extending from the middle portion thereof at right angles thereto, a second motor support cross member solely supported on and slidably mounted transversely on said tongue, and means for clamping the second member to said tongue in a plurality of adjusted positions.

CHARLES A. OLSON.
GLENN A. PATTERSON.